Oct. 18, 1960     L. L. MUELLER     2,956,542
ADJUSTABLE BREEDING COLLAR FOR CHINCHILLA
Filed Feb. 4, 1959

INVENTOR.
LOUISE L. MUELLER
BY
*Victor J. Evans & Co.*
ATTORNEYS

United States Patent Office 2,956,542
Patented Oct. 18, 1960

2,956,542

ADJUSTABLE BREEDING COLLAR FOR CHINCHILLA

Louise L. Mueller, 3 Roth St., East Paterson, N.J.

Filed Feb. 4, 1959, Ser. No. 791,062

3 Claims. (Cl. 119—106)

This invention relates to a collar, and more particularly to a collar for an animal such as a chinchilla.

The object of the invention is to provide a collar which can be conveniently positioned or placed around the animal's neck and wherein the collar is adjustable so that it will fit animals of different sizes or shapes.

Another object of the invention is to provide a collar which is especially suitable for use on chinchillas, and wherein the collar includes a pair of members that are pivotally connected together, and wherein the members are constructed so that when they are in their closed position, a circular aperture or opening is defined which receives the neck of the chinchilla, and wherein there is also provided a novel locking means which is adjustable so that the collar can be locked regardless of the position of the members.

A further object of the invention is to provide a collar which is extremely simple and inexpensive to manufacture.

Other objects and advantages will be apparent during the course of the following description.

In the accompanying drawings, forming a part of this application, and in which like numerals are used to designate like parts throughout the same:

Figure 1:
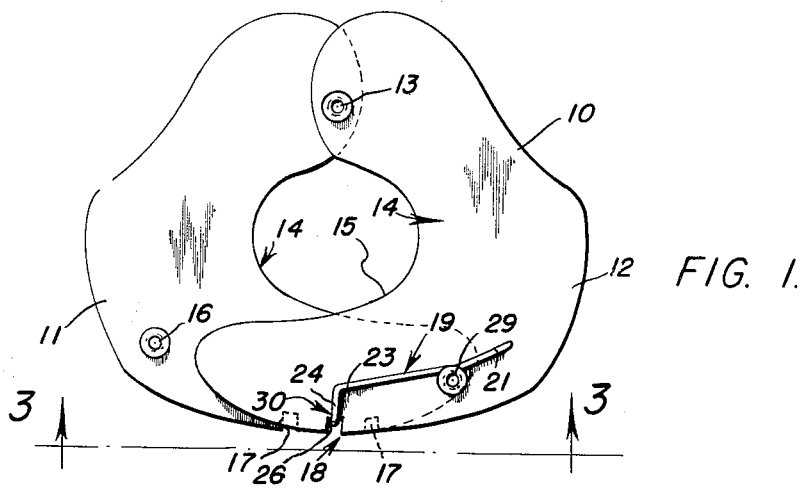
Figure 1 is an elevational view showing the collar in closed position.

Referring in detail to the drawings, the numeral 10 indicates the collar of the present invention which comprises first and second jaws or body members 11 and 12 which are pivotally connected together as at 13. Each of the members 11 and 12 is of a generally crescent shape and each of these members is provided with a cutaway portion 14. When the members 11 and 12 are in the closed position, as for example as shown in Figure 1, the cutaway portions 14 coact to define a circular aperture 15 through which projects the neck of the animal such as the chinchilla. An apertured bushing 16 is mounted in the member 11.

Figure 4:
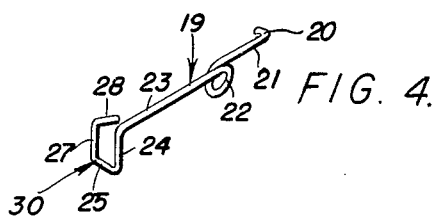
Figure 4 is a perspective view of the spring member.

The first member 11 is provided with a plurality of spaced apart notches 17, and the numeral 18 indicates an adjustable locking mechanism which is provided for retaining the members 11 and 12 in locked or closed position. The locking mechanism 18 comprises a spring member which is indicated generally by the numeral 19, and the spring member 19 is carried by the member 12. As shown in Figure 4 for example, the spring member 19 is of one piece construction and includes a first portion 20 which is secured in place to the member 12. Arranged at right angles with respect to the first portion 20 is a second portion 21 which terminates in a coiled portion 22, and the coiled portion 22 is secured to the member 12 by means of a suitable securing element such as the rivet 29. A third portion 23 extends from the coiled portion 22, and the third portion 23 terminates in a right angularly arranged fourth portion 24. The fourth portion 24 has a fifth portion 25 arranged at right angles thereto, and the fifth portion 25 extends through a slot or cutout 26 in the member 12. The spring member 19 further includes a sixth portion 27 which is arranged at right angles with respect to the portion 25, and the sixth portion 27 has a seventh portion 28 arranged angularly with respect thereto.

Figure 2:
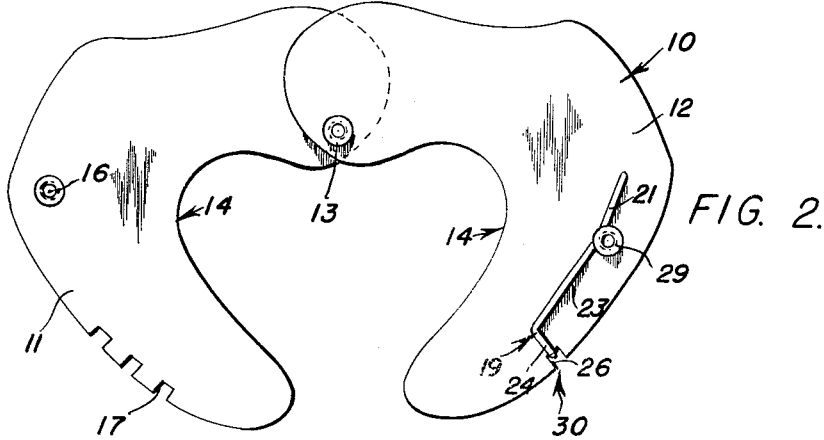
Figure 2 is a view similar to Figure 1, but showing the parts of the collar in open position.
Figure 3:
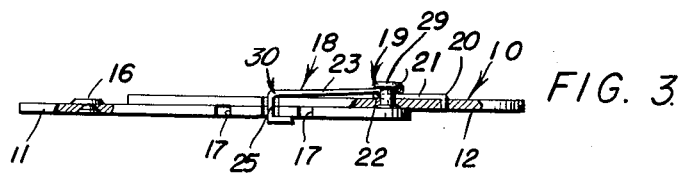
Figure 3 is a sectional view taken on the line 3—3 of Figure 1, and with parts broken away and in section.

From the foregoing, it is apparent that there has been provided a collar which is specially suitable for animals such as chinchillas. In use, when the collar 10 of the present invention is to be used, the members 11 and 12 are adapted to be arranged in the open or extended position as shown in Figure 2, and then when the collar is to be fastened on the chinchilla's neck, the parts are moved from the position shown in Figure 2 to the position shown in Figure 1. It will be noted that with the parts in the position of Figure 1, a circular aperture 15 is defined or provided through which extends the neck of the chinchilla. The pin or element 13 defines a pivot so that the members 11 and 12 can redily be moved from the position shown in Figure 1 to the position shown in Figure 2 or vice versa.

There is further provided a locking device 18 which includes the spring member 19, and it will be seen that when the parts are in the closed position of Figure 1, the portion 25 of the spring member 19 engages one of the notches or slots 17 so as to retain the members 11 and 12 in closed position on the neck of the animal. Due to the provision of the plurality of notches 17, it will be seen that the device is adjustable as to size.

The parts can be made of any suitable material and in different shapes or sizes.

Thus, it will be seen that there has been provided an adjustable collar for chinchillas and other small ranch raised animals. One of the important aspects of the present invention is the locking device 18. In use, the collar is adapted to be used with a three inch ring which is applied to the cage by the rancher. Thus, the collar when used with the ring would prevent the female chinchilla wearing it from following the male animal through the three inch ring aperture. The female at breeding time is sometimes dangerous to the male inasmuch as she can and does frequently kill the male.

With further reference to the unique lock forming part of the collar of the present invention, it will be seen that this lock is adjustable. The collar may be made of a size that permits the collar to be conveniently used with the ring positioned in the cage as previously described.

The member 19 may be made of spring steel. The end 20 is adapted to be inserted into a small opening in the collar so as to function as an anchor. The rivet 29 fastens the member 19 to the collar and the rivet 29 extends through the looped or coiled portion 22. With the spring member 19 anchored as at 20 and as at 29, the hook end as indicated by the numeral 30 bridges over the two halves of the collar so as to hold them together. The bridge is positioned across corresponding notches in each half of the collar, and the resilience of the clip 19 forces the clip down into the bottom of the notches as shown in Figure 1 so as to prevent the collar halves from being accidentally spread apart.

The collar may be made of a suitable material such as plastic and includes the two halves or members 11 and 12 which have a crescent-like shape. The eyelet 13 holds the two members 11 and 12 together and permits them to swing apart for easy application. When the halves 11 and 12 are closed, their combined shapes define a circular aperture 15 through which the animal's head protrudes. The notches such as the notches 17 are for the purpose of locking the collar at the position desired so that the collar is adjustable for different sizes of necks of the animals. The locking is accomplished with the use of the spring clip as previously described.

Some of the advantages of the present invention are as follows. The spring clip 19 is fastened directly to the collar and this eliminates the possibility of a person dropping a clip or screw or any object with which the collar is secured in place while the collar is being put on a kicking, struggling animal. The collar is readily opened by lifting the hook end 30 and then with the fingers the collar can be pulled open. The collar can be slipped around the animal's neck and the animal can be kept facing away from the person. At the back of the animal's neck, the collar is closed which automatically closes at the first notch which is the largest aperture. If the collar is too large at this position, it is only necessary to lift the hook end and slide to the next notch which provides a medium aperture and a smaller aperture can be provided in the same manner if desired or required.

The collar is constructed and arranged so that the narrow side will be placed under the chin of the animal so as to allow functional freedom such as to eat, to wipe the whiskers, litter or the like. The device is light in weight and it is extremely economical.

The member 16 on the collar serves as a counterbalance to the spring on the opposite half so that the position of the collar will have the lock position under the neck of the animal.

Minor changes in shape, size and rearrangement of details coming within the field of invention claimed may be resorted to in actual practice, if desired.

I claim:

1. In a collar, first and second body members each having a generally crescent shape, said body members being pivotally connected together, each of said body members being provided with a cutaway portion and whereby when the body members are in closed position, the cutaway portions coact to define a circular aperture, said first body member being provided with a plurality of spaced apart notches, and a spring member connected to said second body member for selectively engaging said notches.

2. In a collar, first and second body members each having a generally crescent shape, said body members being pivotally connected together, each of said body members being provided with a cutaway portion and whereby when the body members are in closed position, the cutaway portions coact to define a circular aperture, said first body member being provided with a plurality of spaced apart notches, a spring member connected to said second body member for selectively engaging said notches, said spring member including a first portion anchored to said second body member, a second portion arranged at right angles to said first portion and terminating in a coiled portion which is secured to the second body member, a third portion extending from said coiled portion and terminating in a right angularly arranged fourth portion, a fifth portion arranged at right angles to said fourth portion, there being a slot in said second body member for the projection therethrough of said fifth portion, a sixth portion arranged angularly with respect to said fifth portion, and a seventh portion arranged angularly with respect to said sixth portion.

3. In a collar, first and second body members pivotally connected together, each of said body members being provided with opposed cutaway portions and whereby when the body members are in closed position, the cutaway portions coact to define a circular aperture, said first body member being provided with a plurality of spaced apart notches on an outer periphery, and a spring member connected to said second body member adjacent an outer periphery, said spring member including a plurality of portions, one of the portions of the spring member being in selective engagement with said notches.

References Cited in the file of this patent

UNITED STATES PATENTS 1,599,050     Helfenstein _____ Sept. 7, 1926

OTHER REFERENCES

Chinchilla Sales and Supply Catalog, page 29, Dec. 9, 1957.